Dec. 31, 1968 SHIGERU HAYAKAWA 3,419,759

CAPACITOR COMPRISING FERROELECTRIC CERAMIC WITH OXIDIC SILVER ELECTRODES AND HETEROJUNCTION BARRIER LAYER BETWEEN ELECTRODES AND CERAMIC

Filed Jan. 4, 1966 Sheet 1 of 2

INVENTOR
SHIGERU HAYAKAWA

BY Wenderoth, Lind & Ponack
ATTORNEYS

INVENTOR
SHIGERU HAYAKAWA

BY Wenderoth, Lind & Ponack

ATTORNEYS

United States Patent Office 3,419,759
Patented Dec. 31, 1968

3,419,759
CAPACITOR COMPRISING FERROELECTRIC CERAMIC WITH OXIDIC SILVER ELECTRODES AND HETEROJUNCTION BARRIER LAYER BETWEEN ELECTRODES AND CERAMIC

Shigeru Hayakawa, Osaka-fu, Japan, assignor to Matsushita Electric Industrial Co., Ltd., Osaka, Japan
Filed Jan. 4, 1966, Ser. No. 518,611
Claims priority, application Japan, Sept. 17, 1965, 40/57,593
4 Claims. (Cl. 317—230)

ABSTRACT OF THE DISCLOSURE

A heterojunction capacitor is provided which comprises a semi-conductive ferrorelectric ceramic body (e.g. barium titanate), metal (e.g. silver) pigment electrodes thereon, and a semiconductor heterojunction at the interface of the ceramic body and of the metal pigment electrodes, such heterojunction being constituted exclusively by oxidic metal pigment particles and acting as a barrier layer.

This invention relates to a novel heterojunction capacitor made of semiconductive ferroelectric ceramic with metal electrode fired onto the ceramic.

The ceramic body of a conventional barrier layer capacitor has electron-yielding impurity centers in its interior, while zones which are free of mobile charge carriers, so-called barrier layers, are formed in marginal areas which are provided with metal coating. These barrier layers exhibit a rectifying action. The barrier layer capacitor comprises two layers which are oppositely circuited. Accordingly, when an alternating voltage is placed on such capacitor, one of the two layers will, each halfwave, act as a capacity.

It is known to make such barrier layer capacitors of ferroelectric barium titanate. An impurity center doping in such barium titanate ceramic is obtained by addition of oxides of metals and/or by removal of oxygen from the titanate. Such doped or reduced ceramic is a semiconductor characterized by n-type conduction. The aforesaid barrier layer capacitors are prepared by coating a metal thereon as electrodes. Such barrier layer capacitors are characterized by high loss factors and low insulating resistances and are suitable only for low operating voltages. These drawbacks will be eliminated by applying a reoxidation step to the ceramic body in advance of the step of metal coating during the production process of the barrier layer capacitor. It is difficult, however, to control the re-oxidation of a semiconductive ceramic body because the re-oxidation is caused by an oxygen diffusion process and differs from sample to sample, depending on the texture of the ceramics. Furthermore, the aforementioned capacitors have a disadvantage in that the higher the operating voltage is, the lower the capacity per unit area is.

It is well known that a semiconductor heterojunction is formed between semiconducting metals or intermetallic compounds such as germanium, silicon and gallium arsenide. However, the concept of a semiconductor heterojunction formed at the interface between semiconducting oxides or oxide compounds is novel. According to the present invention, a heterojunction can be and is formed at the interface between a semiconductive ferroelectric oxide compound and another oxide of electrode metal by means of an appropriate process and this produces an excellent capacitive action.

An object of the invention is to eliminate the prior art drawbacks and to provide novel heterojunction capacitors with considerably higher voltage stability as well as considerably higher insulation resistance in reverse direction and with at the same time a relatively large capacity, without complicating the process for the production thereof.

It is another object of the invention to provide production methods for the said novel heterojunction capacitors.

The invention contemplates the provision of a heterojunction at the interface between ceramic body and electrode metal whose oxide is p-type or n-type semiconductor.

The realization of the objects of this invention will become clear upon consideration of the following description taken together with accompanying drawings in which.

Figure 1:
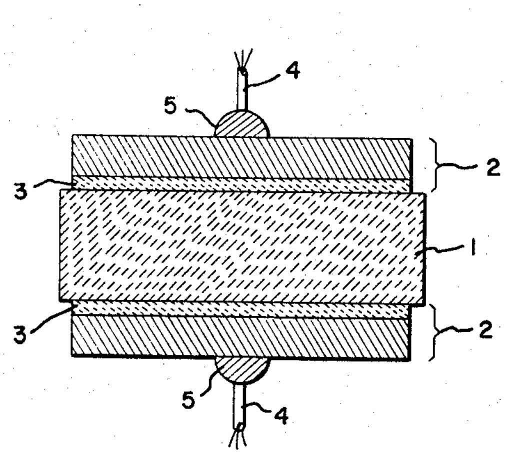
FIG. 1 is a sectional view of a heterojunction capacitor in accordance with this invention.

Referring to FIG. 1, a semiconductive ferroelectric ceramic 1 is coated with metal pigment electrode 2 connected to lead wires 4 by conventional solder 5 in a per se well known method. Firing of the metal pigment coated onto the semiconductive ferroelectric ceramic produces a layer 3 of oxide of pigment metal.

Grains of the metal pigment at the interface between the metal pigment and the ceramics are subjected to epitaxial growth during the firing-on step. According to the present invention, the epitaxial growth plays an important role on the capacitive action, and the metal pigment oxidizes preferentially at the epitaxial growth region as shown in FIG. 2.

Figure 2:
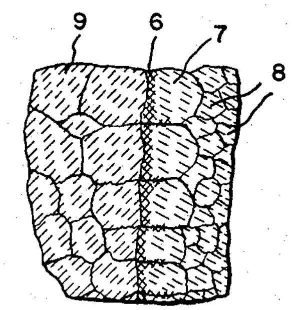
FIG. 2 shows a portion of the interface region of the heterojunction capacitor represented in FIG. 1.

Referring to FIG. 2, wherein 7 designates the epitaxial growth of metal pigment grains attached to the ceramic grains 9 and 8 represents ordinary grains of metal pigment, the preferential oxidation layer 6 of metal pigment is caused, i.e., is produced, at the interface between metal pigment and ceramic.

The epitaxial growth requires a familiarity in the crystal structure between the oxidic metal pigment electrode and ferroelectric ceramics, i.e., an appropriate range of lattice misfit between them.

It is necessary for production of heterojunction in accordance with the invention that the aforementioned oxide of metal pigment be formed at the interface between the ceramic body and the electrode pigment during the firing-on process. Therefore, the electrode pigment should be fired onto the ceramic body in an oxidizing atmosphere.

According to the present invention a heterojunction capacitor can be prepared by employing any ferroelectric ceramic body having a high dielectric constant and an electrical resistivity lower than 50 ohm-cm. and any metal or alloy pigment electrode which is preferentially oxidized at the interface between ferroelectric ceramic body and the pigment electrode when the lattice misfit between ferroelectric ceramic body and the oxidic electrode particles is so small as to produce an epitaxial grain growth of oxidic pigment electrodes. It is of importance that the ferroelectric ceramic body exhibits a resistivity lower than 50 ohm-cm. even when the ceramic body is fired in an oxidizing atmosphere at a temperature which is sufficiently high for firing-on pigment electrodes thereon.

Operable ferroelectric ceramic bodies are, for example, barium titanate doped with rare earth element such as gallium, yttrium and cerium and with partial substitution of barium by strontium, calcium, magnesium. Preferable semiconductive ferroelectric ceramic body can be prepared by firing a pressed body comprising a stoichiometric composition of barium titanate, 0.05 to 0.2 weight percent of aluminum oxide and 0.05 to 0.2 weight percent of silica at temperatures of 1250° to 1400° C. in non-oxidizing atmosphere such as nitrogen, argon and hydrogen.

As intimate contact between the pigment metal oxide semiconductor and the ceramic body forms a potential barrier, i.e., the said heterojunction barrier, characteristic of their energy band structure.

In accordance with another feature of the invention, the capacitive properties are dominantly determined by the electrical properties of the metal oxide semiconductor, such as the dielectric constant, the work function, forbidden energy gap and/or Fermi level. Aforementioned electrical properties of metal oxide semiconductor can be changed by employing alloy pigment electrodes. Therefore, the more suitable electrical properties of the barrier layer capacitor can be obtained by selecting an electrode metal under a predictive consideration of the energy profile of heterojunction. It is necessary for obtaining large capacity that the electrode metal be a metal whose oxide has a high dielectric constant and a high doping level.

According to the invention, the finer powder of said metals results in the greater capacity and a preferable particle size is less than $5\mu$.

It is preferable that the metal pigment be mixed with inorganic binder, having an appropriately low melting-point, such as bismuth oxide and lead oxide for promoting the aforesaid epitaxial grain growth.

Operable pigment electrodes are fine silver or silver alloy powders which are obtained by firing on the semiconductive ferroelectric ceramic body with printed paste thereon at temperature of 400° C. to 800° C. in an oxidizing atmosphere.

Fine powder of silver or silver alloy less than $5\mu$ in particle size is made by grinding a silver or silver alloy ingot in a per se well known method or by chemical coprecipitation method familiar to the art-skilled. A mixture of 60 to 80 weight percent of said powder and 20 to 40 weight percent of organic binder such as polyester and epoxy is well milled in a solvent such as butyl carbitol acetate and benzol. The amount of solvent can be controlled to adjust a viscosity of resultant paste, and is preferred to have a 50 to 90 weight part of solvent to a 100 weight part of metal powder. Since the organic binder and solvent evaporate off after firing, their kind and amount are not essential for producing a heterojunction capacitor. One can use any organic binder which makes the pigment powder adhere strongly to the ferroelectric ceramic body after evaporation of solvent. Any solvent to solve the said organic binder can be employed.

High operating voltage of capacitor arises from large potential barrier of the energy profile in the reverse direction. Furthermore, since the semiconductive basic ceramic body does not re-oxidize in accordance with the invention, the resistance in the forward direction will be much lower than that in the reverse direction. These favorable properties result in a relatively low loss factor at a high frequency.

The treatment explained below is given as an example of the method of producing a heterojunction capacitor according to the invention.

Figure 3:
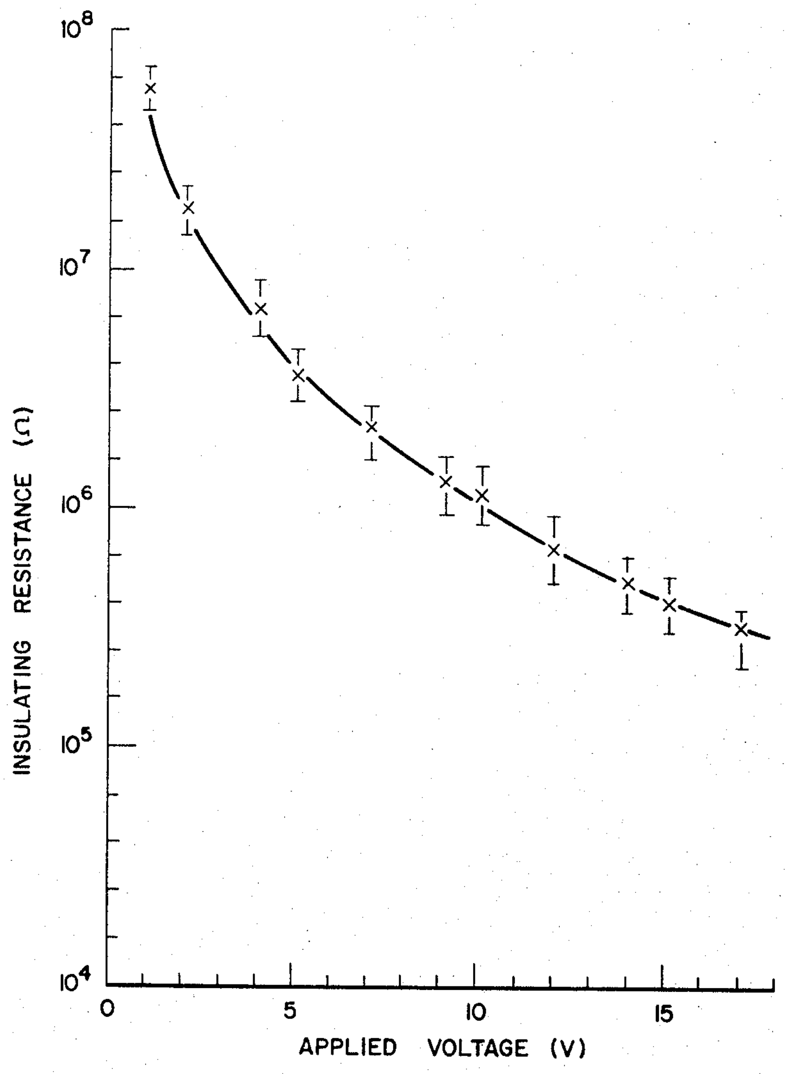
FIG. 3 illustrates graphically a relation between electrical resistance and operating voltage of the novel heterojunction capacitor.

The semiconductive barium titanate is prepared in per se known manner. An equimolecular mixture of titanium oxide and barium carbonate is wet milled with 0.2 weight percentage of cerium oxide and 0.6 weight percentage of titanium oxide, pressed into the form of tablets of 10 mm. diameter and 3 mm. thickness, and sintered at 1380° C. for 2 hours in air. The sintered black-colored body is 8 mm. in diameter and 2 mm. in thickness and has a resistance of 1 ohm. Electrodes are prepared by firing metal pigment onto the basic ceramic body in an oxidizing atmosphere. The solid ingredient of the electrode pigment consists of 95 weight percentage of alloy powder formed of 98 weight percentage of silver and 2 weight percentage of copper, and 5 weight percentage of inorganic binder such as bismuth oxide, lead oxide and antimony oxide. In order to prepare electrode pigment paste, 70 weight percent of said solid ingredient and 30 weight percent of organic binder such as polyester are well mixed in a solvent such as butyl carbitol acetate. The amount of solvent can be controlled in such a manner as to produce an appropriate viscosity of resultant paste. Operable compositions are 100 weight parts of butyl carbitol and 50 weight parts of polyester. The paste so produced is painted on the ceramic body and then fired at 700° C. in air for 30 minutes. Lead wires are soldered onto the electrodes by conventional solder by a per se well known method. Capacity and loss factor are 0.4 f./cm.$^2$ and 3% respectively, at 1 kc. and at 3 volts. The variation in resistance with operating voltage is shown in FIG. 3. The resistance is more than 1MΩ at 10 volts and is still 100KΩ even at 20 volts. The loss factor at 1 mc. amounts to less than 10%.

Changes may be made within the scope and spirit of the appended claims which define what is believed to be new and is desired to have protected by Letters Patent.

What is claimed is:

1. A heterojunction capacitor comprising a semiconductive ferroelectric ceramic body, metal pigment electrodes integrally connected to said ceramic body, and a semiconductor heterojunction at the interface between said ceramic body and said metal pigment electrodes, said heterojunction consisting essentially of oxidic metal pigment particles of said electrodes constituting a rectifying barrier with the ceramic body.

2. A heterojunction capacitor comprising a semiconductive barium titanate ceramic, silver pigment electrodes integrally connected to said ceramic and a semiconductor heterojunction at the interface between said ceramic and said silver pigment electrodes, said heterojunction consisting essentially of oxidic silver pigment particles of said electrodes constituting a rectifying barrier layer with the ceramic body.

3. A heterojunction capacitor according to claim 2, wherein said metal particles are of a particle size not greater than about $5\mu$.

4. A method of making a heterojunction capacitor of a semiconductive barium titanate having electric resistivity less than 50 ohm-cm., silver pigment electrodes and a heterojunction at the interface between the barium titanate and the electrodes, comprising applying to the surface of said semiconductive barium titanate a paste of an electrode silver pigment, and selectively producing at the surface of the thus-applied silver pigment electrodes a barrier layer-forming heterojunction between the electrodes and the semiconductive barium titanate, constituted by oxidic silver pigment particles, by firing-on said applied paste in an oxygen-containing atmosphere, the semiconductive barium titanate remaining unoxidized.

References Cited

UNITED STATES PATENTS

| | | | |
|---|---|---|---|
| 2,583,009 | 1/1952 | Olsen | 317—236 |
| 2,633,543 | 3/1953 | Howatt | 317—258 |
| 2,695,275 | 11/1954 | Gray | 317—258 |
| 2,972,570 | 2/1961 | Haas et al. | 317—258 |
| 3,124,478 | 3/1964 | Cirklu et al. | 317—258 |

JAMES D. KALLAM, *Primary Examiner.*

U.S. Cl. X.R.

29—576; 317—233, 238